(12) United States Patent
Zhang et al.

(10) Patent No.: US 11,536,865 B1
(45) Date of Patent: Dec. 27, 2022

(54) METHOD AND SYSTEM FOR TARGET ORIENTED INTERBED SEISMIC MULTIPLE PREDICTION AND SUBTRACTION

(71) Applicant: SAUDI ARABIAN OIL COMPANY, Dhahran (SA)

(72) Inventors: Dongliang Zhang, Khobar (SA); Ferhan Y. Ahmed, Dhahran (SA); Constantinos Tsingas, Dhahran (SA); Mohammed Mubarak, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/456,959

(22) Filed: Nov. 30, 2021

(51) Int. Cl.
*G01V 1/34* (2006.01)
*G01V 1/30* (2006.01)
*E21B 49/00* (2006.01)
*G01V 1/50* (2006.01)

(52) U.S. Cl.
CPC ............... *G01V 1/34* (2013.01); *E21B 49/00* (2013.01); *G01V 1/30* (2013.01); *G01V 1/50* (2013.01); *G01V 2210/1295* (2013.01); *G01V 2210/1425* (2013.01); *G01V 2210/60* (2013.01)

(58) Field of Classification Search
USPC .......................................................... 702/16
See application file for complete search history.

(56) References Cited

U.S. PATENT DOCUMENTS

| 3,418,625 A | 12/1968 | Anstey |
| 3,421,140 A | 1/1969 | Kerns |
| 3,496,529 A | 2/1970 | Anstey et al. |

(Continued)

FOREIGN PATENT DOCUMENTS

| CN | 108196304 B | 7/2019 |
| CN | 109307886 B | 7/2020 |

OTHER PUBLICATIONS

Jakubowicz, Helmut, "Wave equation prediction and removal of interbed multiples"; SEG Technical Program Expanded Abstracts 1998; pp. 1527-1530; Jan. 1998 (4 pages).

(Continued)

*Primary Examiner* — Paul D Lee

(74) *Attorney, Agent, or Firm* — Osha Bergman Watanabe & Burton LLP

(57) ABSTRACT

Methods and systems for determining an interbed multiple attenuated pre-stack seismic dataset are disclosed. The methods include forming a post-stack seismic image composed of post-stack traces from the pre-stack seismic dataset and identifying a first, second, and third post-stack horizon on each of the post-stack traces. The methods further include for each pre-stack trace, generating a first, second, and third multiple-generator trace based on the first, second and third post-stack horizon and determining a correlation trace based, at least in part, on a correlation between the first multiple-generator trace and the second multiple-generator trace. The methods still further include predicting an interbed multiple trace by convolving the correlation trace and the third multiple-generator trace, determining an interbed multiple attenuated trace by subtracting the interbed multiple trace from a corresponding pre-stack seismic trace, and determining the interbed multiple attenuated pre-stack seismic dataset by combining the interbed multiple attenuated traces.

20 Claims, 8 Drawing Sheets

(56) References Cited

U.S. PATENT DOCUMENTS

| | | | |
|---|---|---|---|
| 2002/0176605 A1 | 11/2002 | Stafsudd et al. | |
| 2003/0018436 A1 | 1/2003 | Stark | |
| 2007/0076525 A1* | 4/2007 | Craft | G01V 1/36 367/38 |
| 2009/0288823 A1* | 11/2009 | Baumstein | G01V 1/36 166/250.16 |
| 2010/0329079 A1* | 12/2010 | Hegge | G01V 1/364 367/53 |
| 2015/0032378 A1* | 1/2015 | Nemeth | G01V 1/30 702/14 |
| 2015/0032379 A1* | 1/2015 | Campbell | G01V 1/362 702/14 |
| 2017/0068009 A1* | 3/2017 | Kostov | G01V 1/364 |
| 2018/0059277 A1* | 3/2018 | Bloor | G01V 1/364 |
| 2018/0335535 A1 | 11/2018 | Qin et al. | |
| 2021/0149066 A1* | 5/2021 | Wu | G01V 1/005 |

OTHER PUBLICATIONS

Zhou, B. et al., "Multiple Suppression by a Wave-equation Extrapolation Method"; Exploration Geophysics; vol. 22, Issue 2; pp. 481-483; 1991 (3 pages).

Griffiths, Malcom et al., "Applications of interbed multiple attenuation"; The Leading Edge; vol. 30, Issue 8; pp. 906-912; Aug. 2011 (5 pages).

Dutta, Gaurav et al., "Practical strategies for interbed multiple attenuation"; SEG Technical Program Expanded Abstracts 2019; pp. 4550-4554; Aug. 2019 (5 pages).

Weglein, Arthur B. et al., "An inverse-scattering series method for attenuating multiples in seismic reflection data"; Geophysics; vol. 62, Issue 6; pp. 1975-1989; Nov.-Dec. 1997 (15 pages).

Coates, R. T. et al., "Internal multiple attenuation using inverse scattering: Results from prestack 1 & 2D acoustic and elastic synthetics"; SEG Technical Program Expanded Abstracts 1996; pp. 1522-1525; Jan. 1996 (4 pages).

* cited by examiner

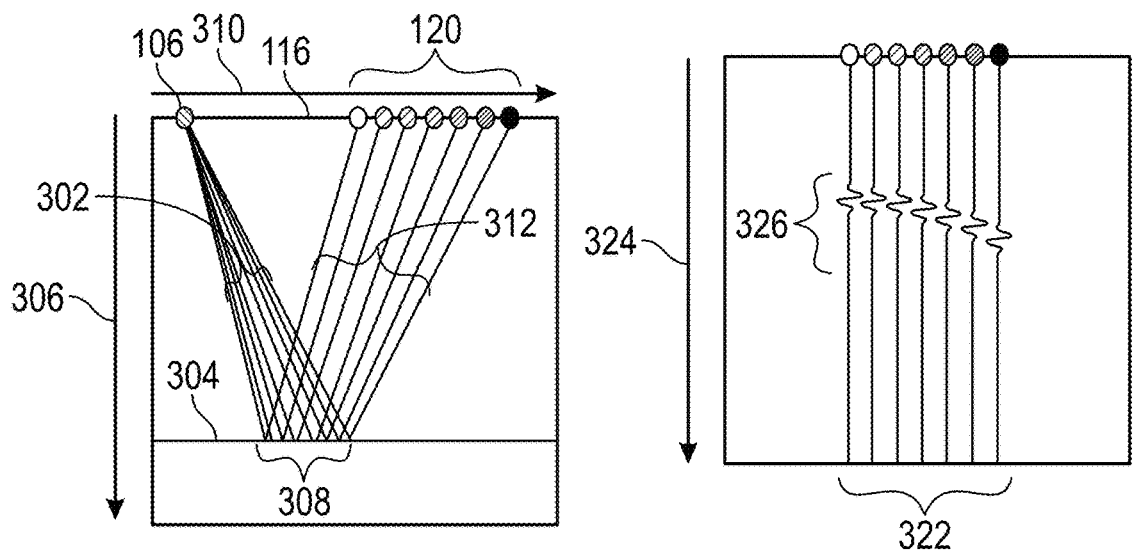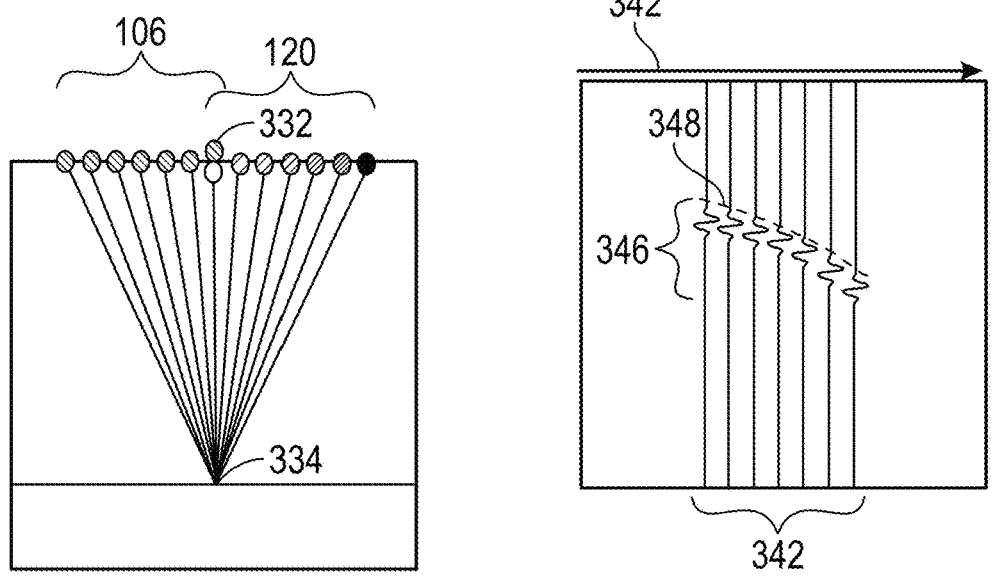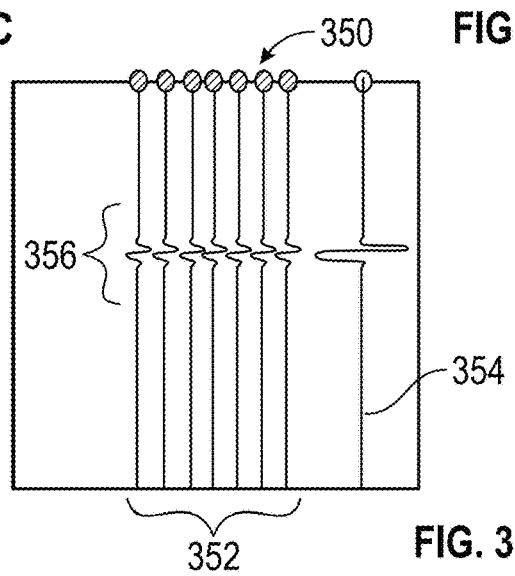
FIG. 3A
FIG. 3B
FIG. 3C
FIG. 3D
FIG. 3E

METHOD AND SYSTEM FOR TARGET ORIENTED INTERBED SEISMIC MULTIPLE PREDICTION AND SUBTRACTION

BACKGROUND

In the oil and gas industry, seismic surveys may be used to image the subsurface and these images may be used in the search for oil and gas reservoirs. The seismic data acquired by seismic surveys must typically be processed to form an image of the subsurface. Seismic processing frequently assumes seismic data is composed of seismic waves that have propagated down into the subsurface from the surface of the earth, have been reflected once from a seismic reflector, and have propagated back to the surface of the earth where they are detected and recorded. Seismic waves that have been reflected once from a seismic reflector are called "primary signals" or simply "primaries".

However, in addition to primaries, seismic data frequently includes seismic waves that have been reflected multiple times. In particular, seismic data may include seismic waves that have been reflected upward from a first seismic reflector, then reflected downward from a second seismic reflector at a shallower depth than the first seismic reflector, and then reflected upward from a third seismic reflector at a deeper depth than the second seismic reflector. Signals of this type are termed "multiple signals" or simply "multiples". When multiples are processed under the erroneous assumption that they are primaries fictious reflectors may appear in the resulting seismic image. Alternatively, real seismic reflectors may be masked or blurred as a result of the multiples in the seismic image.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining an interbed multiple attenuated pre-stack seismic dataset are disclosed. The methods include forming a post-stack seismic image composed of post-stack traces from the pre-stack seismic dataset and identifying a first, second, and third post-stack horizon on each of the post-stack traces. The methods further include for each pre-stack trace, generating a first, second, and third multiple-generator trace based on the first, second and third post-stack horizon and determining a correlation trace based, at least in part, on a correlation between the first multiple-generator trace and the second multiple-generator trace. The methods still further include predicting an interbed multiple trace by convolving the correlation trace and the third multiple-generator trace, determining an interbed multiple attenuated trace by subtracting the interbed multiple trace from a corresponding pre-stack seismic trace, and determining the interbed multiple attenuated pre-stack seismic dataset by combining the interbed multiple attenuated traces.

In general, in one aspect, embodiments relate to a non-transitory computer readable medium storing instructions executable by a computer processor, the instructions including functionality for forming a post-stack seismic image composed of post-stack traces from the pre-stack seismic dataset and identifying a first, second, and third post-stack horizon on each of the post-stack traces. The instructions further include functionality for each pre-stack trace, generating a first, second, and third multiple-generator trace based on the first, second and third post-stack horizon and determining a correlation trace based, at least in part, on a correlation between the first multiple-generator trace and the second multiple-generator trace. The instructions still further include functionality for predicting an interbed multiple trace by convolving the correlation trace and the third multiple-generator trace, determining an interbed multiple attenuated trace by subtracting the interbed multiple trace from a corresponding pre-stack seismic trace, and determining the interbed multiple attenuated pre-stack seismic dataset by combining the interbed multiple attenuated traces.

In general, in one aspect, embodiments relate to a system, including a seismic acquisition system and a seismic processor. The seismic processor is configured to form a post-stack seismic image composed of post-stack traces from the pre-stack seismic dataset and identify a first, second, and third post-stack horizon on each of the post-stack traces. The seismic processor is further configured to, for each pre-stack trace, generate a first, second, and third multiple-generator trace based on the first, second and third post-stack horizon and determine a correlation trace based, at least in part, on a correlation between the first multiple-generator trace and the second multiple-generator trace. The seismic processor is still further configured to predict an interbed multiple trace by convolving the correlation trace and the third multiple-generator trace, determine an interbed multiple attenuated trace by subtracting the interbed multiple trace from a corresponding pre-stack seismic trace, and determine the interbed multiple attenuated pre-stack seismic dataset by combining the interbed multiple attenuated traces.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A-3E show systems in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Interbed multiples are seismic signals that have been reflected three or more times from two or more distinct seismic reflectors within a subterranean region of interest. Embodiments are disclosed describing systems and methods for estimating interbed seismic multiple signals and subtracting them from the observed seismic dataset to determine interbed attenuated pre-stack seismic datasets. Furthermore, methods are disclosed for determining and drilling well paths based on the interbed attenuated pre-stack seismic datasets.

Figure 1:
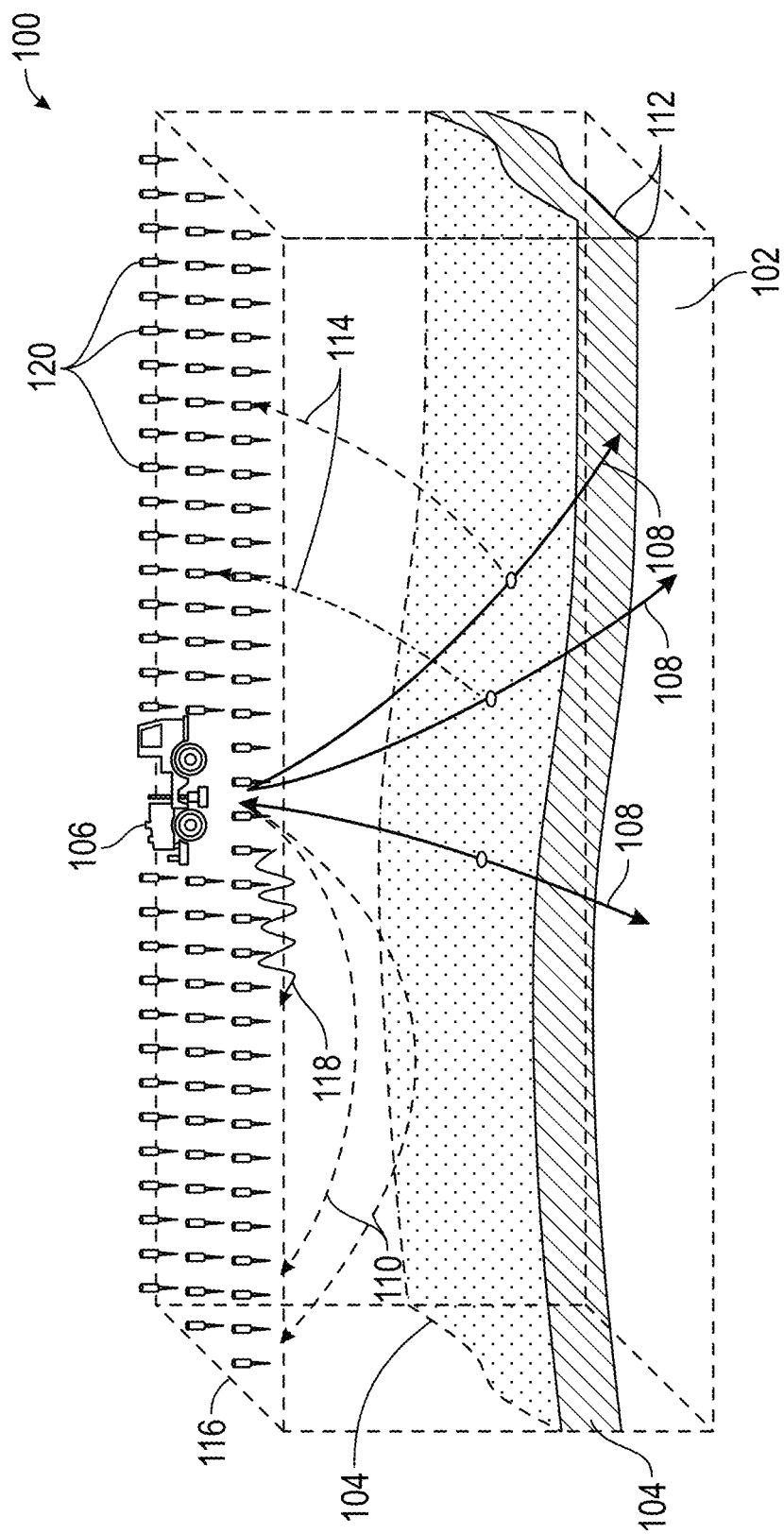
FIG. 1 depicts a seismic survey in accordance with one or more embodiments.

FIG. 1 shows a seismic survey (100) of a subterranean region of interest (102), which may contain a reservoir (104) The seismic survey (100) may utilize a seismic source (106) that generates radiated seismic waves (108). In a land environment, the seismic source (106) may be a dynamite source or one or more seismic vibrator ("vibroseis truck"). In a marine or lacustrine environment, the seismic source (106) may be an air gun. The radiated seismic waves may be recorded by a plurality of seismic receivers. A single activation of the seismic source (106) may be recorded by tens or hundreds of thousands of seismic receivers. Typically, in a land environment the seismic receiver may record the velocity or acceleration of ground-motion, while in a marine or lacustrine environment the seismic receiver may record pressure fluctuations caused by the seismic waves.

The radiated seismic waves (108) may propagate along the ground surface as surface waves ("ground-roll") (118), or the radiated seismic waves may propagate below the surface and return as refracted seismic waves (110) or may be reflected one or more times by geological discontinuities (112) and return to the surface as reflected seismic waves (114).

A seismic dataset must be processed to produce valuable information, such as one or more seismic images or one or more seismic attributes. Typically, a seismic processing workflow addresses a sequence of steps including noise attenuation, acquisition regularization, multiple identification and attenuation, seismic wave propagation velocity determination, seismic imaging, and seismic attribute determination. Several of these steps, such as seismic imaging and seismic attribute attenuation, require further interpretation to identify the locations within the subsurface at which hydrocarbon accumulations may be present. In some embodiments, the interpretation may occur after the generation of the post-stack seismic image or the seismic attribute. In other embodiments, the interpretation may be performed in parallel or interleaved or integrated into the process of determining the post-stack seismic image or the seismic attribute.

Figure 2A:
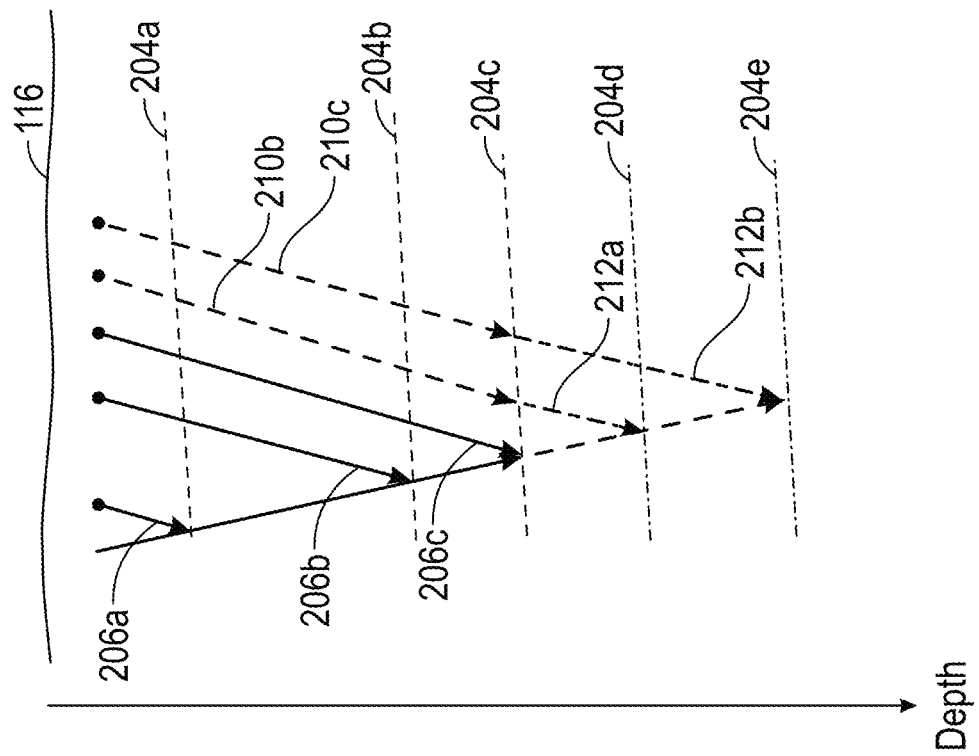
FIGS. 2A-2B show systems in accordance with one or more embodiments.

Many seismic processing methods assume that the seismic data they receive as input have only reflected once in the subsurface. However, as noted earlier, seismic waves may reflect multiple times between the seismic source (106) and the seismic receivers (120). FIG. 2A shows a schematic representation of a seismic wave (202) propagating downward from a seismic source (106). The downward propagating seismic wave (202) may cross several geological discontinuities, such as seismic reflectors (204a, 204b, and 204 c). At each geological discontinuity (204a, 204b, and 204c) the downward propagating seismic wave (202) may generate an upward propagating reflection ("primary reflections"), such as primary reflections (206a, 206b, and 206c). The primary reflections (206a, 206b, and 206c) each contain a portion of the energy from the downward propagating seismic wave (202).

Seismic data processing methods typically assume that the seismic data they receive as input contain only primary reflections. However, upward propagating primary reflections also cross geological discontinuities, such as seismic reflector (204a). At each of these geological discontinuities the upward propagating primary reflection, such as primary reflection (206b) may generate a new downward propagating seismic wave, such as downward propagating seismic wave (208). Note, each of the other primary reflections, such as primary reflection (206c) may also generate a downward propagating seismic wave but for clarity of display these are not shown. A primary reflection may also generate a downward propagating seismic wave at more than one geological discontinuity, such as seismic reflector (204b) but for clarity of display these are not shown.

The downward propagating seismic wave, such as downward propagating seismic wave (208), may in turn cross a geological discontinuity, such as seismic reflectors (204b, 204c), where upward propagating seismic waves (210b, 210c) may be generated. Upward propagating seismic waves (210b, 210c) have been reflected multiple times and are frequently referred to as "multiple reflections" or simply "multiples".

Multiples may be divided into two types depending on where the downward reflection occurs. For "surface multiples" the downward reflection occurs at the earth's surface (116). For "internal multiples" or "interbed" multiples, the downward reflection occurs at a geological interface below the free surface, such as seismic reflector (204a). A person of ordinary skill in the art may use internal multiple and interbed multiples synonymously and, although the term interbed herein, the scope of the invention should be interpreted to include both interbed multiples and internal multiples.

Surface multiples may be distinguished from primary reflections and partially or completely removed from seismic datasets more easily than are interbed multiples, at least in part, because they may be recorded by seismic receivers at the point at which the downward propagating reflection is generated, that is at the earth's surface (116). Interbed multiples (210b, 210c) are typically not recorded at the point at which they are reflected downward, such as at seismic reflector (204a).

The amplitude of both primary reflections and interbed multiples depend in part on the reflection coefficient of the seismic reflectors (e.g., 204a, 20b, and 204c) from which they are generated. Typically, a reflection coefficient lies in the range 0-0.25. Thus, an interbed multiple, that experiences a reflection at each of three seismic reflectors (204a, 204, and 204C), may frequently be much smaller in amplitude than the amplitude of the primary reflections from seismic reflectors (204a, 204, and 204C). Similarly, it is frequently straightforward for one of ordinary skill in the art to distinguish seismic reflectors that are likely to generate significant interbed multiples based on their large primary reflection amplitudes.

Figure 2B:
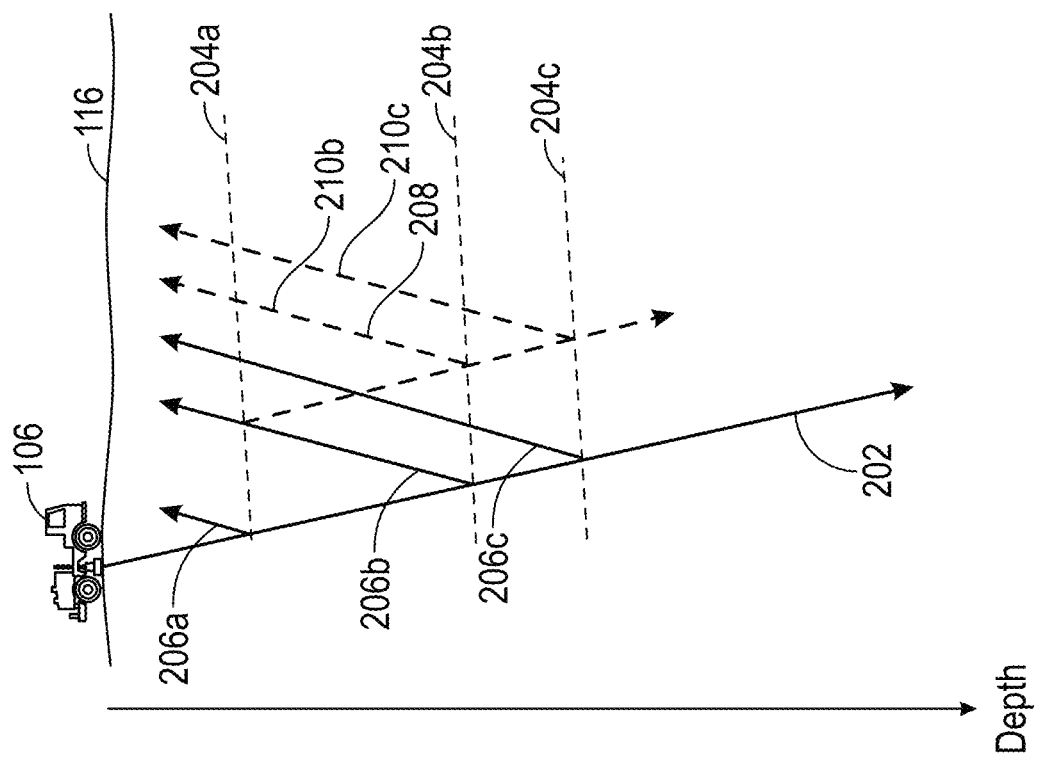

FIG. 2B depicts the erroneous results that arise when seismic processing methods that assume the seismic data they receive as input contain only primary reflections actually receive seismic data that contain primary reflections and interbed multiples as input. While primary reflection (206a) generates an image of seismic reflector (204a), primary reflection (206b) generates an image of seismic reflector (204b), and primary reflection (206c) generates an image of seismic reflector (204c), interbed multiples (210b, 210c) are erroneously back-propagated below (212a, 212b) to generate erroneous seismic reflectors (204d, 204e) in the post-stack seismic image. Such erroneous seismic reflectors may be misinterpreted as real seismic reflectors and may obscure real seismic reflectors, or both.

In some embodiments, the ground-roll (118), refracted seismic waves (110), and reflected seismic waves (114) generated by a single activation of the seismic source (106) are recorded by a seismic receiver (116) as a time-series representing the amplitude of ground-motion at a sequence of discrete times. This time-series may be denoted a seismic "trace". The seismic receivers (116) are positioned at a plurality of seismic receiver locations which we may denote $(x_r,y_r)$ where x and y represent orthogonal axes on the earth's surface above the subterranean region of interest (102). Thus, the refracted seismic waves (110) and reflected seismic waves (114) generated by a single activation of the seismic source (106) may be represented as a three-dimensional "3D" volume with axes $D(t,x_r,y_r)$ where $(x_r,y_r)$ represents the location of the seismic receiver (116) and t denotes the time series at which the amplitude of ground-motion was measured. However, a seismic survey (100) may include recordings of seismic waves generated by a seismic source (106) that is positioned at a plurality of seismic source locations denoted $(x_s,y_s)$. Thus, the seismic volume for a seismic survey (100) may be represented as a five-dimensional volume, denoted $D(t,x_r,y_r,x_s,y_s)$, where $(x_r,y_r)$ are vectors of seismic receiver locations along the x- and y-axes, and $(x_s,y_s)$ are vectors of seismic source locations along the x- and y-axes.

FIG. 3A depicts various stages of seismic processing, in accordance with one or more embodiments. FIG. 3A depicts seismic waves (302) radiating from a seismic source location (106), reflecting from a seismic reflector (304) at a depth indicated by the vertical axis (306) and a plurality of horizontal reflection points (308), propagating as seismic reflections (312) back to the surface (116) and being recorded by an array of seismic receivers (120) covering a range of offsets indicated by the horizontal axis (310).

FIG. 3B shows the plurality of seismic traces (322) recorded by the array of seismic receivers (120). These seismic traces (322), originating from a single seismic source location $(\bar{x}_s,\bar{y}_s)$ maybe denoted $D(t,x_r,y_r,\bar{x}_s,\bar{y}_s)$ and may be called a "source gather" or a "shot gather". The seismic reflections (326) may be detected on traces within a shot gather at increasing two-way travel times, indicated by the vertical axis (324), as the offset (310) of the detecting receiver increases. The phenomenon is often called "moveout".

FIG. 3C shows an alternative sorting of the seismic dataset. In FIG. 3C the seismic sources (106) and the seismic receivers (120) are arranged to have a common midpoint (332). Such an arrangement may be called a "common midpoint gather". In many cases, a common midpoint gather may be more convenient than a shot gather because the reflection point of the seismic waves occurs at the same point (334) on the seismic reflector for all traces in the common midpoint gather.

FIG. 3D shows the traces common midpoint gather (342). The traces in a common midpoint gather may be denoted $D(t,x_o+\bar{x}_m,y_o+\bar{y}_m,x_o-\bar{x}_m,y_o-\bar{y}_m)$ where $(\bar{x}_m,\bar{y}_m)$ is the location of the midpoint and $(\bar{x}_o,\bar{y}_o)$ are vectors of offsets in the x- and y-directions. The seismic reflections (346) in a midpoint gather also exhibit two-way travel time. The two-way travel time of seismic reflections (346) may be said to form a "pre-stack horizon" (342), $t_A(x_0+\bar{x}_m,y_o+\bar{y}_m,x_o-\bar{x}_m,y_o-\bar{y}_m)$.

FIG. 3E shows a pre-stack midpoint gather after correction for two-way travel time moveout. After correction for two-way travel time moveout all of the seismic reflections (356) from a single seismic reflector (304) arrive at the same time and the corrected seismic traces (352) may be summed ("stacked") to form a post-stack seismic trace (354). The post-stack seismic trace (354) may have a higher signal-to-noise ration than traces in the midpoint gather (342).

FIG. 3E depicts a pre-stack midpoint gather after correcting for two-way travel time using a technique called normal moveout correction. However, this choice is made for illustrative purposes and should not be interpreted as limiting the scope of the invention in any way. Indeed, the invention may be applied to data arranged as pre-stack time migration gathers. Further, the data need not be arranged as midpoints gather, rather the invention may be applied to normal moveout corrected or time migrated shot gathers (each with a single source location and many receiver locations) or moveout corrected or time migrated receiver-gathers (each with a single receiver location and many source locations).

Figure 4:
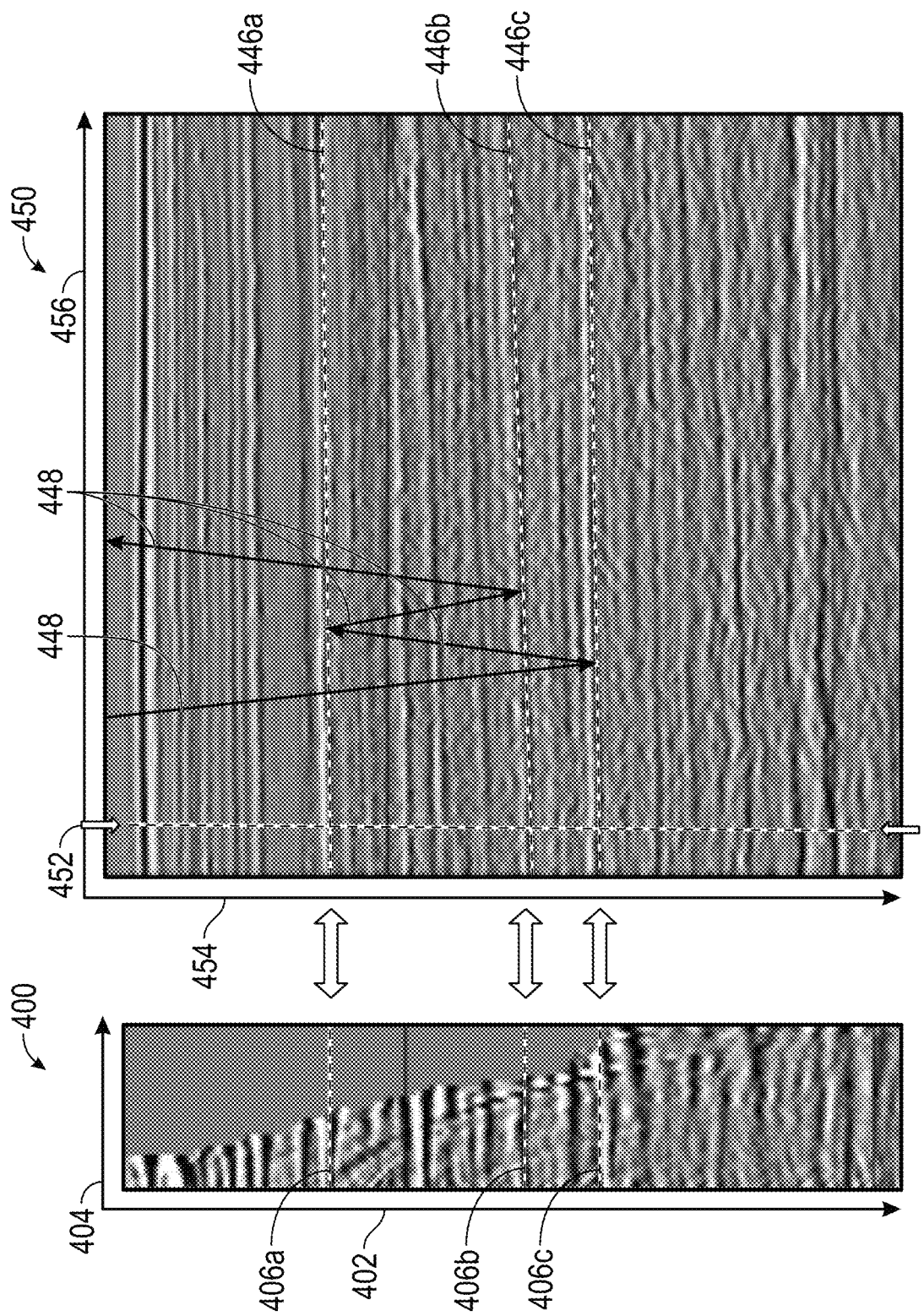
FIG. 4 shows seismic datasets in accordance with one or more embodiments.

FIG. 4 shows an example of a midpoint gather after moveout correction (400) in accordance with one or more embodiments. The vertical axis (402) indicates two-way travel time and the horizontal axis (404) indicates offset. The amplitude of each seismic trace is represented on a grayscale (not shown). The multiple horizontal bands (406a-c) represent seismic reflections from a plurality of seismic reflectors. The seismic traces displayed in midpoint gather (400) may be stacked to generate a single post-stack trace (452) in the post-stack seismic image (450). The post-stack seismic image displays a plurality of post-stack seismic traces (452) each running vertically with two-way travel time indicated on the vertical axis (454) and each post-stack seismic trace (452) arranged on the horizontal axis (456) indicating the horizontal position of the midpoint of the midpoint gather (400) from which the post-stack seismic trace (452) was derived.

The post-stack seismic image (450) may be regarded as an image of the subsurface. A seismic reflector (304) may appear on the post-stack seismic image (450) as a "post-stack horizon". For example, the pre-stack horizon (406a) in the midpoint gather (400) may generate a portion of the post-stack horizon (446a) in the post-stack seismic image (450). Similarly, the pre-stack horizon (406b) may generate a portion of the post-stack horizon (446b), and the pre-stack horizon (406c) may generate a portion of the post-stack horizon (446c) in the post-stack seismic image (450). These three post-stack horizons (446a, 446b, 446c) may be identified as generator of interbed multiples as seismic waves reverberate between them (448). In particular, high amplitude post-stack horizons may be more likely to generate interbed multiples. Interbed multiple generating post-stack horizons may be identified on the post-stack seismic image (450) and corresponding pre-stack horizons (406a, 406b, 406c) may be identified on the midpoint gather (400) from the post-stack horizons (446a, 446b, 446c).

Although the post-stack horizons (446a, 446c) at which the interbed multiple experiences upward reflections are shown as different and distinct post-stack horizons, in some cases the post-stack horizons (446a) and (446c) may be the same post-stack horizon.

Figure 5:
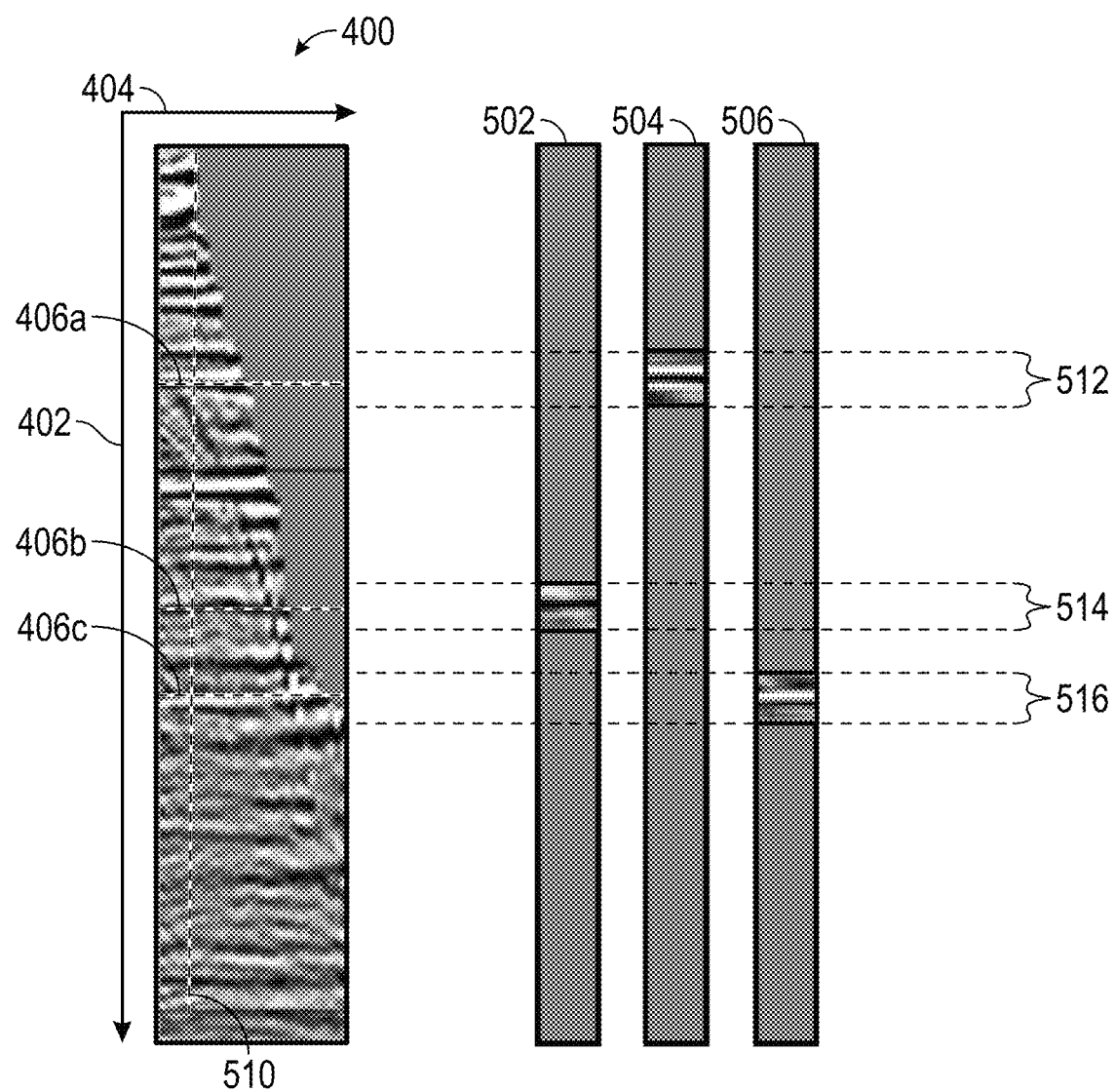
FIG. 5 shows seismic datasets in accordance with one or more embodiments.

FIG. 5 depicts a first multiple-generator trace (502), a second multiple-generator trace (504), and a third multiple-generator trace (506), in accordance with one or more embodiments. Each multiple generator trace may be selected from a seismic trace (510) or a plurality of adjacent seismic traces in a midpoint gather (400). The first multiple-generator trace (502) may include a two-way travel time window (512) of samples surrounding the pre-stack horizon (406a). Samples in the first multiple-generator trace (502) outside this two-way travel time window (512) may be set to zero. Similarly, the second multiple-generator trace (504) may include a two-way travel time window (514) of samples surrounding the pre-stack horizon (406b) and the third multiple-generator trace (506) may include a two-way travel time window (516) of samples surrounding the pre-stack horizon (406c).

Figure 6:
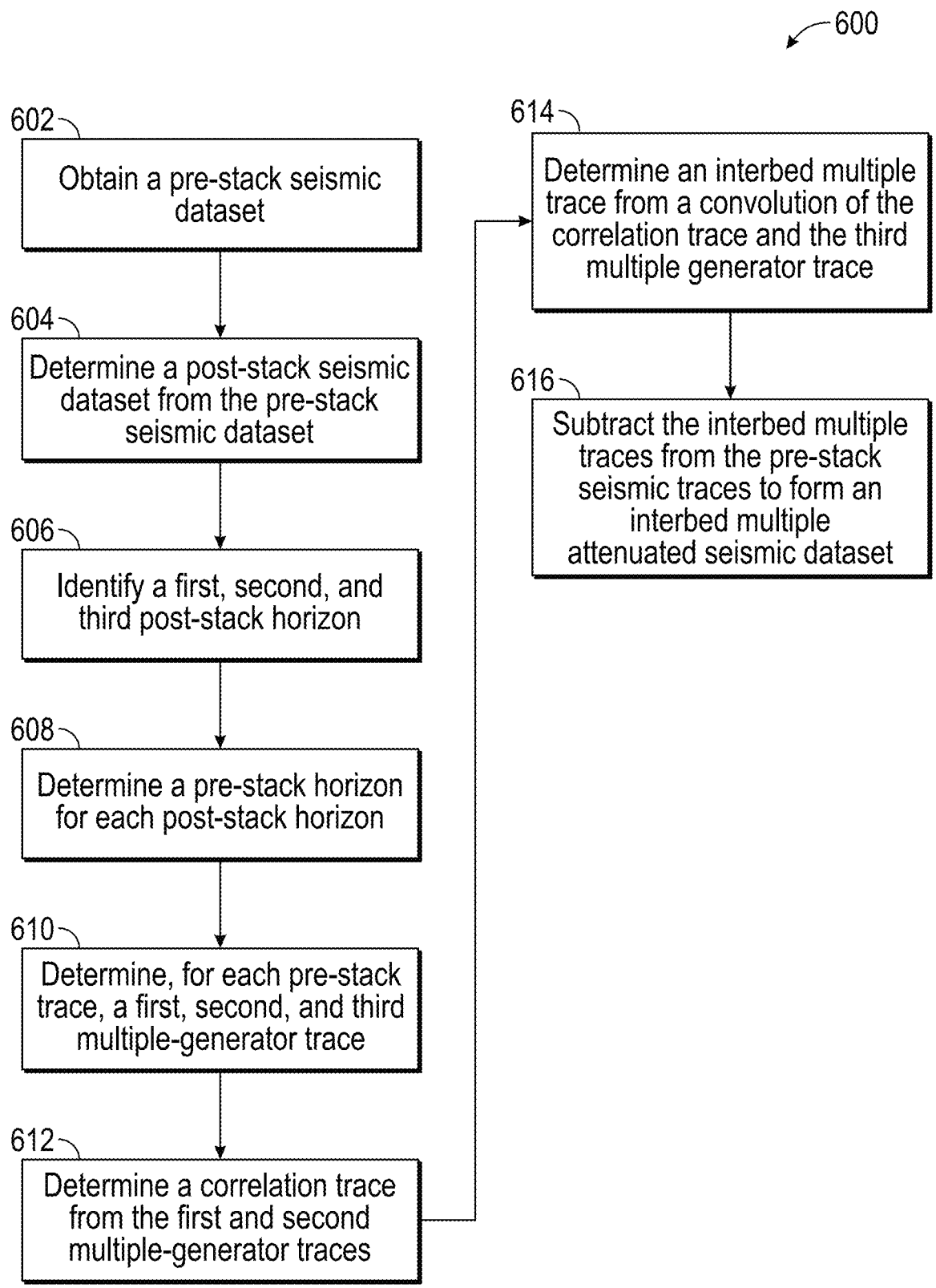
FIG. 6 shows a flowchart in accordance with one or more embodiments.

FIG. 6 shows a flowchart (600) in accordance with one or more embodiments. FIG. 6 begins with Step 602 in which a pre-stack seismic dataset may be obtained. The pre-stack seismic dataset may be acquired with using a seismic survey (100). The seismic dataset may include a plurality of pre-stack gathers that may be midpoint gathers (342). Furthermore, the seismic dataset may include a plurality of moveout corrected midpoint gathers (350). The moveout corrected midpoint gathers (350) may be generated using normal moveout, dip moveout, or pre-stack time migration.

In Step 604, in accordance with one or more embodiments, a post-stack seismic image (450) may be determined from the pre-stack seismic dataset. The post-stack seismic image (450) may be determined by stacking (summing) over offset a plurality of midpoint gather (350), each having an adjacent midpoint.

In Step 606, a first (446a), second (446b), and third post-stack horizon (446c) may be selected. The post-stack horizons may be selected based on a likelihood that they form interbed multiple generating horizons. The post-stack horizons may be selected based on their amplitude that may be larger than other horizons in the post-stack seismic image. The post-stack horizons may be selected based on their two-way travel time. In some embodiments, the first post-stack horizon (446a) and the third post-stack horizon (446c) may be different horizons, but in other embodiments the first post-stack horizon (446a) and the third post-stack horizon (446c) may be the same horizon.

In Step 608, in accordance with one or more embodiments, a pre-stack horizon in at least one midpoint gather (400) may be determined for each post-stack horizon in the post stack image (450). In particular, a first pre-stack horizon (406a) may be determined from the first post-stack horizon (446a), a second pre-stack horizon (406b) may be determined from the second post-stack horizon (446b), and a third pre-stack horizon (406c) may be determined from the third post-stack horizon (446c). As for the post-stack horizons, in some embodiments, the first pre-stack horizon (406a) and the third pre-stack horizon (406c) may be different horizons, but in other embodiments they may be the same pre-stack horizon.

In Step 610 a first (502), second (504), and third (506) multiple-generator trace may be determined for each pre-stack trace (510). Each multiple-generator trace may be determined by selecting a portion of the pre-stack trace (510) surrounding a pre-stack horizon. The portion may be a two-way travel time window of time samples surround the pre-stack horizon. Other samples of the multiple-generator trace may be set to zero. For example, the first multiple-generator trace (502) may include samples from a two-way travel time window (514) surrounding the pre-stack horizon (406b). Depending on the size of window, one or more than one seismic events may be included within the window. Similarly, the second multiple-generator trace (504) may include samples from a two-way travel time window (512) surrounding the pre-stack horizon (406a), and the third multiple-generator trace (506) may include samples from a two-way travel time window (516) surrounding the pre-stack horizon (406c).

In Step 612, a correlation trace may be determined for each pair of one first multiple-generator trace and one second multiple-generator trace, in accordance with one or more embodiments. The correlation trace, cr(t) may be calculated based on the first multiple-generator trace, $d_1(t)$, and the second multiple-generator trace, $d_2(t)$, as the cross-correlation:

$$cr(t) = \int_0^T d_1(\tau) d_2(\tau+t) d\tau \qquad \text{Equation (1)}$$

where T denotes the length of the multiple-generator traces. Equation (1) describes cross-correlation in the time-domain for continuous functions, but a person having ordinary skill in the art will appreciate that analogous expressions for cross-correlation are well known for discretely sampled functions, or that the cross-correlation may be performed in the frequency-domain. The cross-correlation performed in Step 612 may be performed for discretely sampled multiple-generator traces and/or may be performed in the frequency-domain without departing from the scope of the invention.

In Step 614, an interbed multiple trace may be determined, in accordance with one or more embodiments. The interbed multiple trace, m(t), may be calculated based on the correlation trace, cr(t) and the third multiple-generator trace, $d_3(t)$, as the convolution:

$$m(t) = \int_0^T cr(\tau) d_3(t-\tau) d\tau \qquad \text{Equation (2)}$$

where T denotes the length of the third multiple-generator trace. As for the cross-correlation performed in Step 612, the convolution in Equation (2) may be performed for discretely sampled data and/or may be performed in the frequency-domain without departing from the scope of the invention.

In accordance with one or more embodiments, the interbed multiple trace, m(t), may be subtracted from the pre-stack trace (510) from which it was calculated to determine an interbed multiple attenuated trace. The resulting interbed multiple attenuated trace contains little or no interbed multiple energy. In some embodiments, the subtraction methods may be curvelet domain subtraction using a mask or a machine learning enabled subtraction. In other embodiments, the subtraction may be performed using adaptive subtraction. The adaptive subtraction may be performed on a pre-stack seismic trace by pre-stack seismic trace basis or may be performed on the basis of a set of pre-stack seismic traces with adjacent midpoints.

In accordance with some embodiments, the adaptive subtraction may further include determining a seismic source wavelet for at least on pre-stack seismic trace and "doubly deconvolving" the seismic source wavelet from the interbed multiple trace prior to subtracting, or adaptively subtracting it from the pre-stack trace. A double deconvolution may be understood deconvolving the seismic source wavelet from the interbed multiple trace determined in Step 614, and then deconvolving the seismic source wavelet again from the result of the first deconvolution. Equivalently, a double deconvolution may be though of as self-convolving the seismic source wavelet with itself and deconvolving the self-convolved seismic source wavelet from the interbed multiple trace determined in Step 614.

In accordance with other embodiments, the adaptive subtraction may include match filtering each the interbed multiple a trace to modify the amplitude and phase spectrum of the interbed multiple trace to match the amplitude and phase spectrum of the corresponding pre-stack trace.

Further, in Step 616, in accordance with one or more embodiments, the interbed attenuated multiple traces may be collected to form an interbed multiple attenuated pre-stack seismic dataset.

Figure 7:
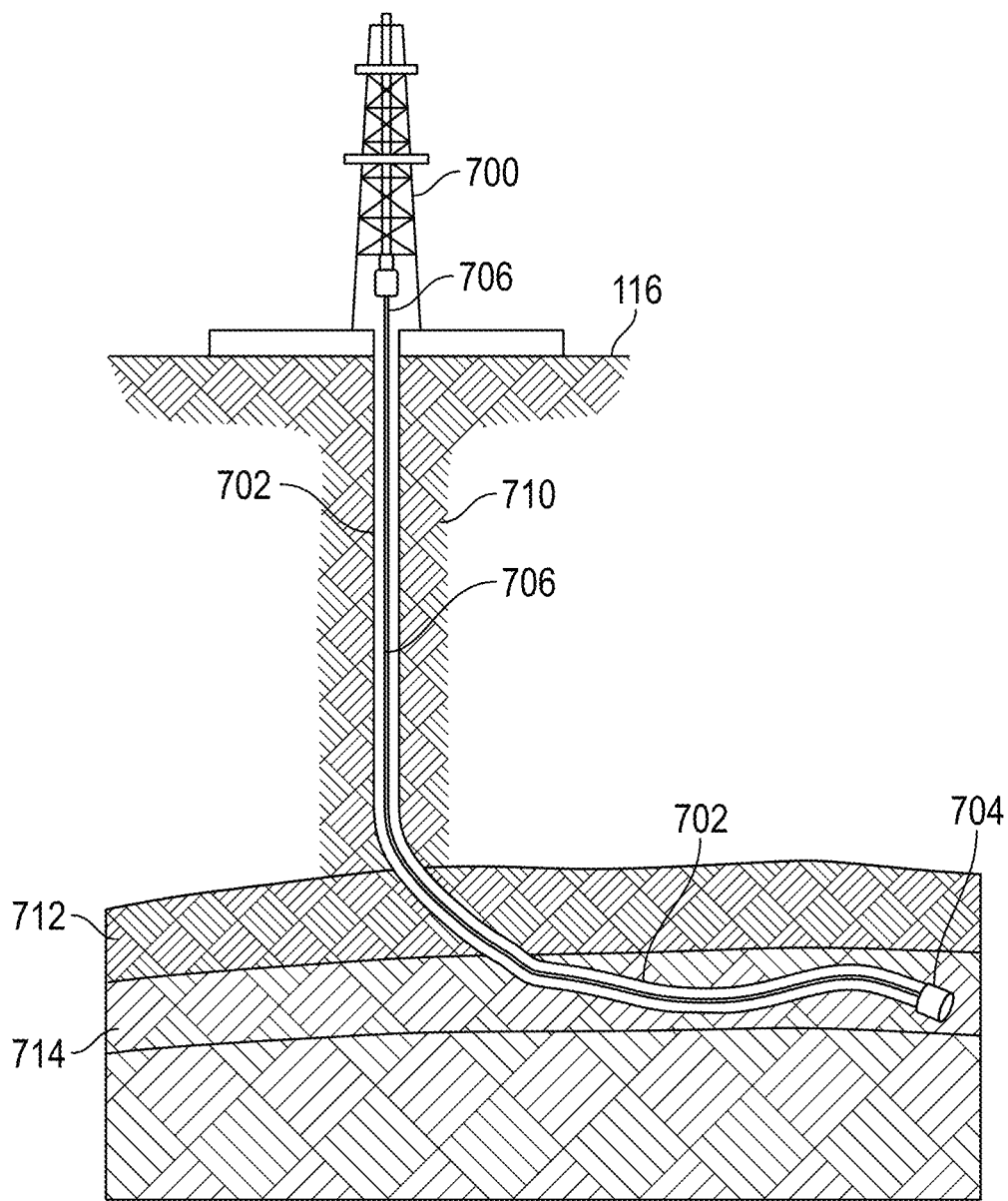
FIG. 7 shows a drilling system in accordance with one or more embodiments.

FIG. 7 illustrates systems in accordance with one or more embodiments. As shown in FIG. 7, a well path (702) may be drilled by a drill bit (704) attached by a drillstring (706) to a drill rig (700) located on the Earth's surface (116). The well may traverse a plurality of overburden layers (710) and one or more cap-rock layers (712) to a hydrocarbon reservoir (714). In accordance with one or more embodiments, the interbed multiple attenuated pre-stack seismic dataset may be used to plan and drill a well path (702). The well path (702) may be a curved well path, or a straight well path. All or part of the well path (702) may be vertical.

Figure 8:
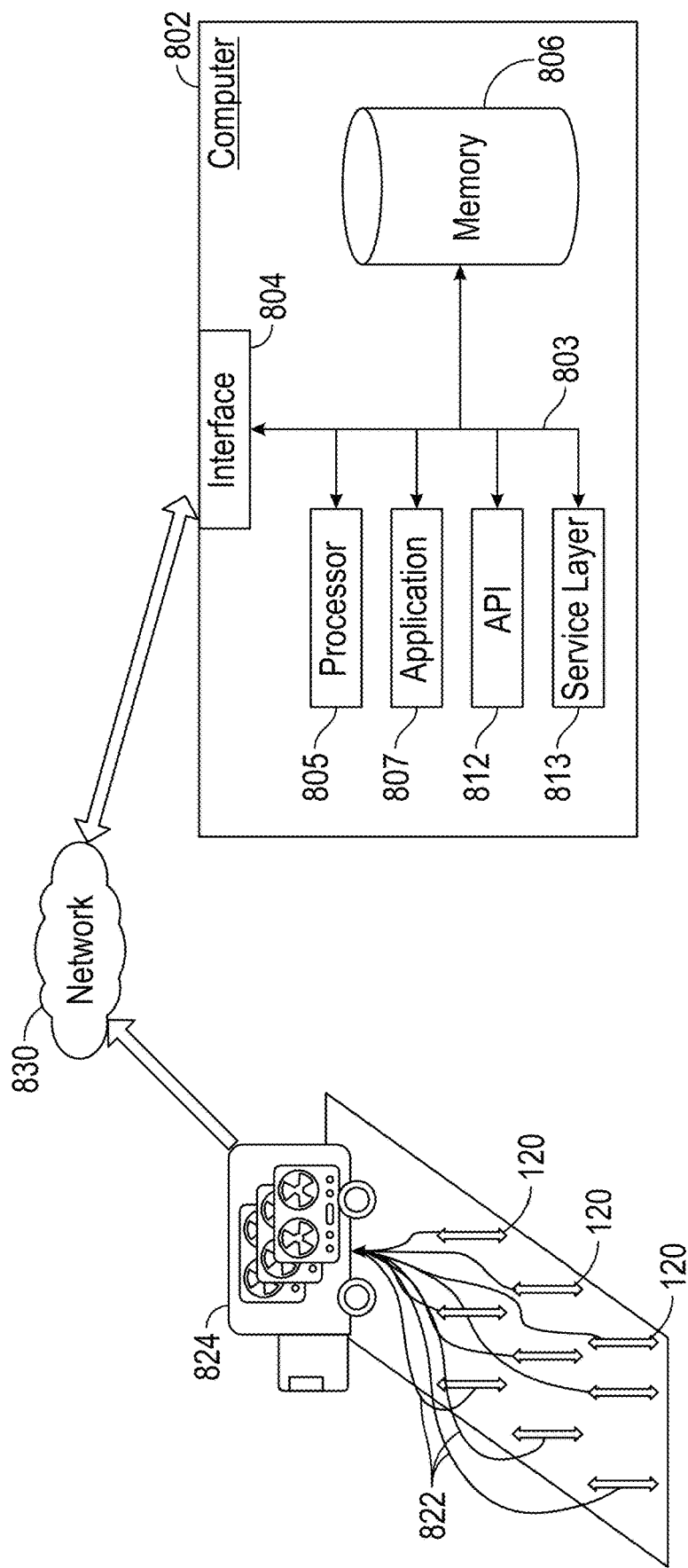
FIG. 8 shows a system in accordance with one or more embodiments.

FIG. 8 shows a seismic recording and processing system, in accordance with one or more embodiments. The data recorded by a plurality of seismic receivers (120) may be transmitted to a seismic recording facility (824) located in the neighborhood of the seismic survey (100). The seismic recording facility may be one or more seismic recording trucks. The plurality of seismic receivers (120) may be in digitally or analogic telecommunication with the seismic recording facility (824). The telecommunication may be performed over telemetry channels (822) that may be electrical cables, such as coaxial cables, or may be performed wireless using wireless systems, such as Wi-Fi or Bluetooth. Digitization of the seismic data may be performed at each seismic receiver (120), or at the seismic recording facility (824), or at an intermediate telemetry node (not shown) between the seismic receiver (120) and the seismic recording facility (824).

The seismic data may be recorded at the seismic recording facility (824) and stored on non-transitory computer memory. The computer memory may be one or more computer hard-drives, or one or more computer memory tapes, or any other convenient computer memory media familiar to one skilled in the art. The seismic data may be transmitted to a computer (802) for processing. The computer (802) may be located in or near the seismic recording facility (824) or may be located at a remote location, that may be in another city, country, or continent. The seismic data may be transmitted from the seismic recording facility (824) to a computer (802) for processing. The transmission may occur over a network (830) that may be a local area network using an ethernet or Wi-Fi system, or alternatively the network (830) may be a wide area network using an internet or intranet service. Alternatively, seismic data may be transmitted over a network (830) using satellite communication networks. Most commonly, because of its size, seismic data may be transmitted by physically transporting the computer memory, such as computer tapes or hard drives, in which the seismic data is stored from the seismic recording facility (802) to the location of the computer (802) to be used for processing.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for determining an interbed multiple attenuated pre-stack seismic dataset, comprising:
    obtaining a pre-stack seismic dataset, wherein the pre-stack seismic dataset comprises a plurality of pre-stack traces;
    forming, using a computer processor, a post-stack seismic image comprising a plurality of post-stack traces from the pre-stack seismic dataset;
    identifying a first post-stack horizon, a second post-stack horizon, and a third post-stack horizon on each of the plurality of post-stack traces;
    for each pre-stack trace, using a computer processor:
        generating a first multiple-generator trace based, at least in part, on the first post-stack horizon;
        generating a second multiple-generator trace based, at least in part, on the second post-stack horizon;
        generating a third multiple-generator trace based, at least in part, on the third post-stack horizon;
        determining a correlation trace based, at least in part, on a correlation between the first multiple-generator trace and the second multiple-generator trace;
        predicting an interbed multiple trace based, at least in part, on a convolution of the correlation trace and the third multiple-generator trace; and
        determining an interbed multiple attenuated trace based, at least in part, on subtracting the interbed multiple trace from a corresponding pre-stack seismic trace,
    determining the interbed multiple attenuated pre-stack seismic dataset by combining the interbed multiple attenuated traces.

2. The method of claim 1, wherein predicting each multiple-generator trace comprises:
    determining a pre-stack horizon from a corresponding post-stack horizon;
    determining a time window enclosing the pre-stack horizon; and
    determining the multiple generator trace from pre-stack time samples within the time window.

3. The method of claim 1, further comprising planning and drilling a well path based, at least in part, on the interbed multiple attenuated seismic dataset.

4. The method of claim 1, wherein the pre-stack seismic dataset comprises a time domain pre-stack dataset.

5. The method of claim 1, wherein each post-stack horizon comprises a local extremum of an amplitude of the post-stack seismic image.

6. The method of claim 1, wherein a two-way travel time of the first post-stack horizon and a two-way travel time of the third post-stack horizon are greater than a two-way travel time of the second horizon.

7. The method of claim 1, wherein the first post-stack horizon and the third post-stack horizon are identical post-stack horizons.

8. The method of claim 1, wherein the subtraction of the predicted interbed multiple trace from the corresponding pre-stack seismic trace comprises an adaptive subtraction.

9. The method of claim 8, wherein the adaptive subtraction comprises a match filtering.

10. A non-transitory computer readable medium storing instructions executable by a computer processor, the instructions comprising functionality for:
receiving a pre-stack seismic dataset, wherein the pre-stack seismic dataset comprises a plurality of pre-stack traces;
forming a post-stack seismic image comprising a plurality of post-stack traces from the pre-stack seismic dataset;
identifying a first post-stack horizon, a second post-stack horizon, and a third post-stack horizon on each of the post-stack traces;
for each pre-stack trace:
generating a first multiple-generator trace based, at least in part, on the first post-stack horizon;
generating a second multiple-generator trace based, at least in part, on the second post-stack horizon;
generating a third multiple-generator trace based, at least in part, on the third post-stack horizon;
determining a correlation trace based, at least in part, on a correlation between the first multiple-generator trace and the second multiple-generator trace;
predicting an interbed multiple trace based, at least in part, on a convolution of the correlation trace and the third multiple-generator trace; and
determining an interbed multiple attenuated trace based, at least in part, on subtracting the interbed multiple trace from the pre-stack seismic trace,
determining an interbed multiple attenuated pre-stack seismic dataset by combining the interbed multiple attenuated traces.

11. The non-transitory computer readable medium of claim 10, wherein predicting each multiple-generator trace comprises:
determining a pre-stack horizon from a corresponding post-stack horizon;
determining a time window enclosing the pre-stack horizon; and
determining the multiple generator trace from pre-stack time samples within the time window.

12. The non-transitory computer readable medium of claim 10, the instructions further comprising functionality for planning a well path based, at least in part, on the interbed multiple attenuated seismic dataset.

13. The non-transitory computer readable medium of claim 10, wherein the pre-stack seismic dataset comprises a time domain dataset.

14. The non-transitory computer readable medium of claim 10, wherein each post-stack horizon comprises a local extremum of an amplitude of the post-stack seismic image.

15. The non-transitory computer readable medium of claim 10, wherein a two-way travel time of the first post-stack horizon and the two-way travel time of the third post-stack horizon are greater than the two-way travel time of the second horizon.

16. The non-transitory computer readable medium of claim 10, wherein the first post-stack horizon and the third post-stack horizon are identical post-stack horizons.

17. The non-transitory computer readable medium of claim 10, wherein the subtraction of the predicted interbed multiple trace from the pre-stack seismic trace comprises an adaptive subtraction.

18. The non-transitory computer readable medium of claim 17, wherein the adaptive subtraction comprises a match filtering.

19. A system, comprising:
a seismic acquisition system; and
a seismic processor, configured to:
receive a pre-stack seismic dataset, wherein the pre-stack seismic dataset comprises a plurality of pre-stack traces;
forming a post-stack seismic image comprising a plurality of post-stack traces from the pre-stack seismic dataset;
identify a first post-stack horizon, a second post-stack horizon, and a third post-stack horizon on each of the post-stack traces;
for each pre-stack trace:
generate a first multiple-generator trace based, at least in part, on the first post-stack horizon;
generate a second multiple-generator trace based, at least in part, on the second post-stack horizon;
generate a third multiple-generator trace based, at least in part, on the third post-stack horizon;
determine a correlation trace based, at least in part, on a correlation between the first multiple-generator trace and the second multiple-generator trace;
predict an interbed multiple trace based, at least in part, on a convolution of the correlation trace and the third multiple-generator trace; and
determine an interbed multiple attenuated trace based, at least in part, on subtracting the interbed multiple trace from the pre-stack seismic trace,
determine an interbed multiple attenuated pre-stack seismic dataset by combining the interbed multiple attenuated traces.

20. The system of claim 19, wherein a two-way travel time of the first post-stack horizon and the two-way travel time of the third post-stack horizon are greater than the two-way travel time of the second horizon.

* * * * *